United States Patent
Wu et al.

(10) Patent No.: US 6,775,722 B2
(45) Date of Patent: Aug. 10, 2004

(54) EFFICIENT DATA RETRIEVAL FROM INPUT COUPLING QUEUES

(75) Inventors: David Wu, Sunnyvale, CA (US); Jerry Kuo, San Jose, CA (US)

(73) Assignee: Zarlink Semiconductor V. N. Inc., Irvine, CA (US)

( * ) Notice: Subject to any disclaimer, the term of this patent is extended or adjusted under 35 U.S.C. 154(b) by 347 days.

(21) Appl. No.: 09/899,426

(22) Filed: Jul. 5, 2001

(65) Prior Publication Data

US 2003/0009609 A1 Jan. 9, 2003

(51) Int. Cl.[7] .................................................. G06F 3/00
(52) U.S. Cl. .......................... 710/53; 710/52; 710/5; 710/6; 710/20; 710/21; 710/29; 710/54
(58) Field of Search ........................... 710/52, 5, 6, 20, 710/21, 29, 53, 54

(56) References Cited

U.S. PATENT DOCUMENTS

| | | | | |
|---|---|---|---|---|
| 5,920,572 A | * | 7/1999 | Washington et al. | 370/535 |
| 6,483,846 B1 | * | 11/2002 | Huang et al. | 370/445 |
| 2002/0035656 A1 | * | 3/2002 | Tate | |

* cited by examiner

Primary Examiner—Jeffrey Gaffin
Assistant Examiner—Justin Knapp
(74) Attorney, Agent, or Firm—Tucker Ellis & West LLP

(57) ABSTRACT

An architecture for data retrieval from a plurality of coupling queues. At least first and second data queues are provided for receiving data thereinto. The data is read from the at least first and second data queues with reading logic, the reading logic reading the data according to a predetermined queue selection algorithm. The data read from by reading logic and forwarded to an output queue.

26 Claims, 2 Drawing Sheets

EFFICIENT DATA RETRIEVAL FROM INPUT COUPLING QUEUES

BACKGROUND OF THE INVENTION

1. Technical Field of the Invention

This invention is related to network switch fabrics, and more specifically, to data control and retrieval from the buffering mechanisms contained therein.

2. Background of the Art

The evolution of the Internet and other global communication networks continue to attract an ever-increasing number of nodal entities which place strategic importance on the viability of such networks for the communication of information for commercial and personal use. Such information places higher demands on the network infrastructure to ensure not only that the information arrives at the desired destination, but that it arrives in a timely manner.

Most modern switching devices can move information at wire speed and it is a goal is to ensure that the switching device is not the bottleneck of network data flow. However, with network bandwidth requirements pushing the development and implementation of faster transmission technologies e.g., Gigabit Ethernet, internal data flow of such switching devices becomes more important in order to maintain data throughput at such wire speeds.

Many switching devices utilize queues for the temporary storage of data while processing logic has time to sort out the destination information, and to send the data on its way. Consequently, queuing performance is very important.

What is needed is an architecture that provides efficient queuing performance that ensures overflow will not occur in Gigabit Ethernet implementations.

SUMMARY OF THE INVENTION

The present invention disclosed and claimed herein, in one aspect thereof, comprises an architecture for data retrieval from a plurality of coupling queues. At least first and second data queues are provided for receiving data thereinto. The data is read from the at least first and second data queues with reading logic, the reading logic reading the data according to a predetermined queue selection algorithm. The data read from by reading logic and forwarded to an output queue.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
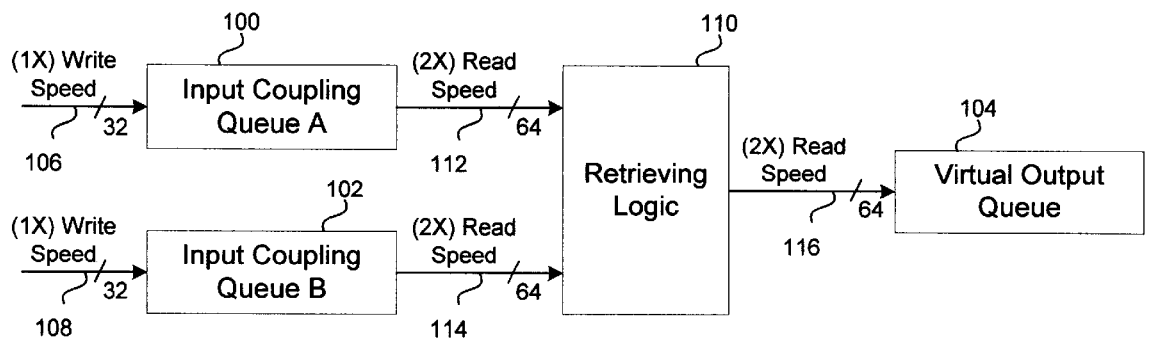
FIG. 1 illustrates a block diagram of the coupling queue architecture, according to a disclosed embodiment.

Referring now to FIG. 1, there is illustrated a block diagram of a coupling queue architecture, according to a disclosed embodiment. The disclosed architecture provides two input coupling queues: a first coupling queue 100 (also denoted as Queue A), and a second coupling queue 102 (also denoted as Queue B) which share (or support) one virtual output queue 104. A first input port 106 is connected to provide 32-bit data into the first coupling queue 100, and a second input port 108 connects to provide 32-bit data into the second coupling queue 102. Thus each input port 106 and 108 has a corresponding and independent input coupling queue 100 and 102 which temporarily stores the input data.

Retrieving (or reading) logic 110 operates to retrieve (or read) the contents of the coupling queues 100 and 102 according to a predetermined selection algorithm, and pass the retrieved contents on to the virtual output queue 104. Thus the retrieving logic 110 connects to the output of the first coupling queue 100 to retrieve data therefrom across an associated 64-bit data bus 112 at a speed which is approximately twice the speed in which 32-bit data is being input to (or written into) the first coupling queue 100. Similarly, the retrieving logic 110 connects to the output of the second coupling queue 102 to retrieve data therefrom across a corresponding 64-bit data bus 114 at a speed which is approximately twice the speed in which 32-bit data is being input to the second coupling queue 102. In general, the reading speed for retrieving data from the coupling queue 100 (or 102) is approximately twice the speed in which the data is being written into the coupling queue 100 (or 102).

Writing to the virtual output queue 104 from the retrieving logic 110 is fragment-based, i.e., when reading commences from one of the input coupling queues 100 (or 102), the read operation does not stop until the end of the current data fragment is detected. The reading logic 110 then forwards the 64-bit data across a connection 116 to the virtual output queue 104 at approximately twice the speed at which the data was written into the coupling queue. Data latency is minimized such that once a data fragment enters the coupling queue, the read/write process to the virtual output queue 104 begins. Additionally, the enqueued data is read as fast as possible to prevent the occurrence of an overflow state in either of the coupling queues 100 and 102.

The size of each input coupling queue size is approximately twice the maximal data fragment size. The minimal data fragment size is preferably approximately $1/16^{th}$ of the maximal data fragment size. The size of the input data fragment preferably ranges from approximately $1/16^{th}$ of the maximal data fragment size up to and including the maximal data fragment size.

The reading algorithm neither utilizes a traditional ping-pong method based on the fragment size to read the enqueued data nor reads the enqueued data based upon which input queue (100 or 102) has more data. Either implementation causes increased latency for certain types of data resulting in the overflow of one or both coupling queues 100 and 102. For example, use of the traditional simple ping—ping method where the first queue 100 buffers short data fragments and the second queue 102 buffer long data fragments will ultimately result where the first queue 100 will be reach an overflow state. In another example, if there is a 256-byte data fragment being written into the first coupling queue 100, 64 bytes are already in the first queue 100, and a 32-byte fragment is already in the second queue 102, then the data in the first queue 100 is longer than data in the second queue 102. Thus if the reading method utilized is that which operates based on which queue has more data, the first queue would be chosen for reading. However, in this case, it is preferable to first read the data from the second queue 102 since reading from the first queue 100 cannot end until the complete fragment is read. The read operation of the second queue 102 for the smaller fragment would start and complete in a much shorter period of time, and reduce the potential for latency in that second queue 102. On the other hand, the read operation of the first queue 100 would initially be at approximately twice the input writing speed for the beginning of the fragment data, but would slow down to the same speed as the writing speed for the remaining data of the larger fragment as the read operation catches up to the input write speed. If time $t_1$ is the total time for reading data from both the first and second queues 100 and 102, and time $t_2$ is the total time required if first reading from the second queue 102, then apparently $t_1 > t_2$.

Figure 2:
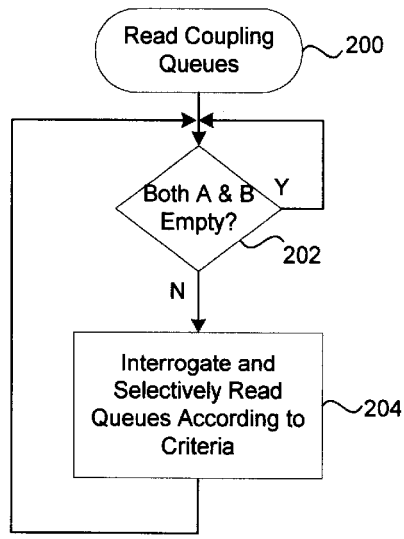
FIG. 2 illustrates a flow chart for the general algorithm of the retrieval logic, in accordance with a disclosed embodiment.

Referring now to FIG. 2, there is illustrated a flow chart of the general algorithm of the retrieval logic, in accordance with a disclosed embodiment. Flow begins at a starting point 200 and continues to a decision block 202 to determine if both of the coupling queues 100 and 102 are empty. If so, flow is out the "Y" path to the input of the decision block 202 to continue monitoring for such a condition. If either the first queue 100 or the second queue 102, or both queues 100 and 102 have enqueued data, flow is out the "N" path of decision block 202 to function block 204 to interrogate and selectively read the queues 100 and 102 according to pre-determined criteria. The queue read operation, which includes all processing necessary to extract one or more complete data fragments from the queue being read, continues until both the first queue 100 and the second queue 102 are empty, at which time flow is from function block 204 to the input of decision block 202. Note also that the size of the data fragments vary according to the particular application. Thus the disclosed architecture can read enqueued data fragments of varying sizes. The queue selection operation occurs only after finishing the current fragment reading.

Figure 3:
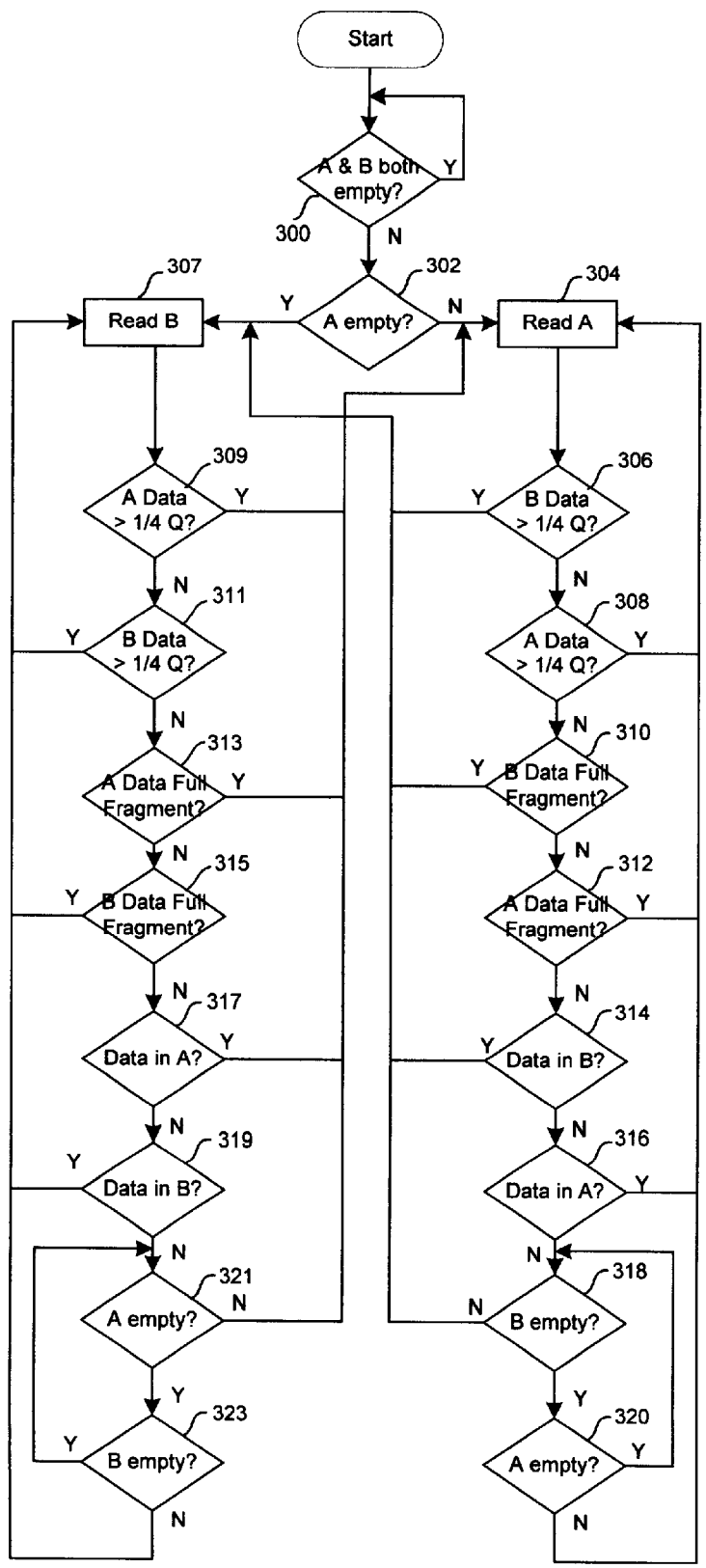
FIG. 3 illustrates a more detailed flow chart of the algorithm for monitor and control of data in both input queues.

Referring now to FIG. 3, there is illustrated a more detailed flow chart of the algorithm for monitor and control of data in both input queues. Flow begins at a Start block and continues to a decision block 300 to determine if both coupling queues 100 and 102 are empty. If so, flow is out the "Y" path and loops back to the input to continue monitoring the status of both queues 100 and 102. If either one has a enqueued data, flow is out the "N" path of decision block 300 to a decision block 302 to determine if the first queue 100 is empty. If not, flow is out the "N" path to a function block 304 to read the first queue 100. Flow continues then to a decision block 306 to determine if the amount of data enqueued in the second queue 102 has exceeded 25% of its total queue capacity. If so, flow is out the "Y" path to a function block 307 to read the enqueued data fragments from the second queue 102. Detailed discussion of this portion of the flow chart will continue hereinbelow after completion of the discussion for the first queue 100.

As indicated hereinabove, the disclosed architecture efficiently moves data from the two input coupling queues to the virtual output queue with good data latency and minimal input coupling queue size, and never allows input coupling queue overflow. This is accomplished by ensuring that overflow in either input queue 100 or 102 is prevented. Thus it is important to first check on parameters indicating that a particular queue is reaching capacity. To that end, the disclosed algorithm first checks on the 25%-full trigger, and then the full-fragment criteria. These or any other criteria can be adjusted to the particular application, as desired, as well as the order, so long as overflow is prevented.

If the amount of data in the second queue 102 has not exceeded 25% of the queue capacity, flow is out the "N" path of decision block 306 to a decision block 308 to determine if the amount of data enqueued in the first queue 100 has exceeded 25% of the total queue capacity. If so, flow is out the "Y" path to function block 304 to then read the first queue 100 until it is empty. If not, flow is out the "N" path to a decision block 310 to determine if the second queue 102 has enqueued therein a full data fragment. If a full fragment is enqueued, flow is out the "Y" path to function block 307 to read the second queue 102 until it is empty. If a full fragment is not enqueued, flow is out the "N" path to a decision block 312 to determine if the first queue 100 has enqueued therein a full data fragment. If so, flow is out the "Y" path to function block 304 to read the first queue 100 until it is empty. If not, flow is out the "N" path of decision block 312 to a decision block 314 to determine if the second queue 102 has enqueued therein any data. If the second queue 102 has any data, flow is out the "Y" path to function block 307 to read the second queue 102 until it is empty. If not, flow is out the "N" path to a decision block 316 to determine if the first queue 100 has enqueued therein any data. If so, flow is out the "Y" path to function block 304 to read the first queue 100 until it is empty. If not, flow is out the "N" path of decision block 316 to a decision block 318 to determine if the second queue 102 is empty. If it is not empty, flow is out the "N" path to function block 307 to read the second queue 102 until it is empty. If it is empty, flow is out the "Y" path to a decision block 320 to determine if the first queue 100 is empty. If so, flow is out the "Y" path, and loops back to the input of decision block 318 to again determine of the second queue 102 is empty. On the other hand, if the second queue 102 is empty, but the first queue 100 is not empty, flow is out the "N" path of decision block 320 to function block 304 to read the first queue 100 until it is empty.

Note that if any of the criteria are met in decision blocks 306, 310, 314, or 318, flow jumps over to function block 307 read data from the second queue 102. Continuing with the flowchart from function block 307, flow is then to a decision block 309 to determine if the amount of data enqueued in the first queue 100 has exceeded 25% of its total queue capacity. If so, flow is out the "Y" path to function block 304 to read the enqueued data fragments from the first queue 100. If the amount of data in the first queue 100 has not exceeded 25% of the queue capacity, flow is out the "N" path of decision block 309 to a decision block 311 to determine if the amount of data enqueued in the second queue 102 has exceeded 25% of its total queue capacity. If so, flow is out the "Y" path to function block 307 to then read the second queue 102 until it is empty. If not, flow is out the "N" path to a decision block 313 to determine if the first queue 100 has enqueued therein a full data fragment. If so, flow is out the "Y" path to function block 304 to read the first queue 100 until it is empty. If not, flow is out the "N" path to a decision block 315 to determine if the second queue 102 has enqueued therein a full data fragment. If so, flow is out the "Y" path to function block 307 to read the second queue 102 until it is empty. If not, flow is out the "N" path of decision block 315 to a decision block 317 to determine if the first queue 100 has enqueued therein any data. If so, flow is out the "Y" path to function block 304 to read the first queue 100 until it is empty. If not, flow is out the "N" path to a decision block 319 to determine if the second queue 102 has enqueued therein any data. If so, flow is out the "Y" path to function block 307 to read the second queue 102 until it is empty. If not, flow is out the "N" path of decision block 319 to a decision block 321 to determine if the first queue 100 is empty. If not, flow is out the "N" path to function block 304 to read the first queue 100 until it is empty. If so, flow is out the "Y" path to a decision block 323 to determine if the second queue 102 is empty. If so, flow is out the "Y" path, and loops back to the input of decision block 321 to again determine of the first queue 100 is empty. On the other hand, if the first queue 100 is empty, but the second queue 102 is not empty, flow is out the "N" path of decision block 323 to function block 307 to read the second queue 102 until it is empty.

The disclosed architecture utilizes an algorithm which reads the data based upon both the status of the data fragment and which queue has more data, and which is exemplified as follows.

```
IF (both A and B are empty){where A and B are respective input
coupling queues
      THEN do nothing
}
IF (at least one of A and B is changed from empty to not empty){
      THEN chose the one not empty (if both are NOT empty,
      then choose accordingly)
}
IF (current_reading = A){
      IF (data_in_B > ¼ input coupling queue size){
         Chose B for the next reading (after finishing the current
         packet reading)
      }
      ELSE IF (data_in_A > ¼ input coupling queue size){
         Chose A for the next reading
      }
      ELSE IF (data_in_B is a full data fragment){
         Chose B for the next reading
      }
      ELSE IF (data_in_A is a full data fragment){
         Chose A for the next reading
      }
      ELSE IF (there is a data in A and B){
         Chose B for the next reading
      }
      ELSE IF (there is data in A){
         Chose A for the next reading
      }
      ELSE {
         Do nothing
      }
}
ELSE IF (current_reading = B){
      IF (data_in_A > ¼ input coupling queue size){
         Chose A for the next reading
      }
      ELSE IF (data_in_B > ¼ input coupling queue size){
         Chose B for the next reading
      }
      ELSE IF (data_in_A is a full data fragment){
         Chose A for the next reading
      }
      ELSE IF (data_in_B is a full data fragment){
         Chose B for the next reading
      }
      ELSE IF (there is data in A and B){
         Chose A for the next reading
      }
      ELSE IF (there is data in B){
         Chose B for the next reading
      }
      ELSE {
         Do nothing
      }
}
```

Following is software code which exemplifies the application of the flow chart of FIG. 3.

```
// Coupling Queue
// incpl_arb_cst: state machine
// incpl_a_id_rdy_next: A has data
// mode_4X4: mode select,
// incpl_a_has_frag: A data full fragment
// incpl_b_has_frag: B data full fragment
// incpl_a_gt_64: A data > ¼ Q
// incpl_b_gt_64: B data > ¼ Q
// incpl_b_id_rdy_next: B has data
// incpl_a_rd_eom,incpl_b_rd_eom: when this signal is "1", a new
// selection is made, otherwise stay with the old selection
always @(incpl_arb_cst or incpl_a_id_rdy_next or mode_4x4 or
      incpl_a_has_frag or incpl_b_has_frag or
      incpl_a_gt_64 or incpl_b_gt_64 or
      incpl_b_id_rdy_next or incpl_a_rd_eom or incpl_b_rd_eom)
case incpl_arb_cst)// synopsys parallel_case
   empty_priority_a:
      casex ({incpl_a_id_rdy_next,mode_4x4,
         incpl_b_id_rdy_next})// synopsys parallel_case
      3'b1xx: incpl_arb_nxt = select_incpl_a;
      3'b001: incpl_arb_nxt = select_incpl_b;
      3'b01x,
      3'b0x0: incpl_arb_nxt = empty_priority_a;
      endcase
   select_incpl_a:
      casex ({incpl_a_gt_64, incpl_b_gt_64,
         incpl_a_has_frag,incpl_b_has_frag,
         incpl_a_rd_eom,mode_4x4,incpl_b_id_rdy_next,
         incpl_a_id_rdy_next})// synopsys parallel_case
      8'bx1_xx_1xxx: incpl_arb_nst = select_incpl_b;
      8'b10_xx_1xxx: incpl_arb_nst = select_incpl_a;
      8'b00_x1_101x: incpl_arb_nst = select_incpl_b;
      8'b00_10_10x1: incpl_arb_nst = select_incpl_a;
      8'b00_00_101x: incpl_arb_nst = select_incpl_b;
      8'bxx_xx_0xxx,
      8'b00_00_1001,
      8'b00_00_11x1: incpl_arb_nst = select_incpl_a;
      8'b00_00_1000: incpl_arb_nst = empty_priority_b;
      default: incpl_arb_nst = empty_priority_a;
      // 6'00_11x0: incpl_arb_nst = empty_priority_a;
      endcase
   empty_priority_b:
      casex ({incpl_b_id_rdy_next,
         incpl_a_id_rdy_next})// synopsys parallel_case
      2'b1x: incpl_arb_nst = select_incpl_b;
      2'b01: incpl_arb_nst = select_incpl_a;
      2'b00: incpl_arb_nst = empty_priority_b;
      endcase
   select_incpl_b:
      casex ({incpl_a_gt_64, incpl_b_gt_64,
         incpl_a_has_frag,incpl_b_has_frag,
         incpl_b_rd_eom,mode_4x4,incpl_a_id_rdy_next,
         incpl_b_id_rdy_next})// synopsys parallel_case
      8'b1x_xx_1xxx: incpl_arb_nst = select_incpl_a;
      8'b01_xx_1xxx: incpl_arb_nst = select_incpl_b;
      8'b00_1x_1x1x: incpl_arb_nst = select_incpl_a;
      8'b00_01_10x1: incpl_arb_nst = select_incpl_b;
      8'b00_00_1x1x: incpl_arb_nst = select_incpl_a;
      8'bxx_xx_0xxx,
      8'b00_00_1001: incpl_arb_nst = select_incpl_b;
      default: incpl_arb_nst = empty_priority_a;
      endcase
endcase
```

Although the preferred embodiment has been described in detail, it should be understood that various changes, substitutions and alterations can be made therein without departing from the spirit and scope of the invention as defined by the appended claims.

What is claimed is:

1. A method of data retrieval from a plurality of queues, comprising the steps of:
    providing at least first and second data queues for receiving data thereinto;
    reading said data from said at least first and second data queues with reading logic, said reading logic reading said data according to a predetermined queue selection algorithm;

wherein said queue selection algorithm in the reading step monitors the status of said data in both said at least first and second data queues such that if said second data queue triggers predetermined criteria while said first queue is being read, said reading logic selects said second queue for reading; and forwarding said data read from said reading logic to an output queue.

2. The method of claim 1, wherein said reading logic in the reading step reads said data from said at least first and second data queues at a rate which approximates twice the speed in which said data is received into said at least first and second data queues.

3. The method of claim 1, wherein each of said at least first and second data queues in the providing step are operable to receive 32-bit data.

4. The method of claim 1, wherein each of said at least first and second data queues in the providing step are operable to output 64-bit data.

5. The method of claim 1, wherein said reading logic in the reading step outputs 64-bit data to said output queue.

6. The method of claim 1, wherein said reading logic in the reading step outputs 64-bit data to said output queue at a rate which approximates twice the speed at which said data is input into each of said at least first and second data queues.

7. The method of claim 1, wherein said predetermined criteria is when said data enqueued in said second data queue exceeds approximately 25% of the capacity of said second data queue.

8. The method of claim 1, wherein when reading logic in the reading step begins to read a fragment of said data, said reading logic continues to read said fragment until an end of said fragment is detected.

9. The method of claim 1, wherein the size of either of said at least first and second data queues in the providing step is approximately twice the size of a largest data fragment which can be input to either of said at least first and second data queues.

10. The method of claim 1, wherein said at least first data queue in the providing step is operable to enqueue said data which is fragmented, said fragmented data ranging from a minimum size to approximately sixteen times said minimum size.

11. The method of claim 1, wherein said at least first data queue in the providing step is operable to enqueue said data which is randomly fragmented, said randomly fragmented data ranging from a minimum fragment size to approximately sixteen times said minimum fragment size.

12. The method of claim 1, wherein said reading logic in the reading step reads a data fragment from said at least first data queue only when a complete said data fragment is enqueued therein.

13. The method of claim 1, wherein said first data queue is selected for reading enqueued data therefrom only after said reading logic has completed reading said data of said second data queue in the step of reading.

14. An apparatus for data retrieval from a plurality of queues, comprising:

at least first and second data queues for receiving data thereinto;

reading logic for reading said data from said at least first and second data queues, said reading logic reading said data according to a predetermined queue selection algorithm;

wherein said queue selection algorithm monitors the status of said data in both said at least first and second data queues such that if said second data queue triggers predetermined criteria while said first queue is being read, said reading logic selects said second queue for reading; and an output queue for receiving said data read from said at least first and second data queues by said reading logic.

15. The apparatus of claim 14, wherein said reading logic reads said data from said at least first and second data queues at a rate which approximates twice the speed in which said data is received into said at least first and second data queues.

16. The apparatus of claim 14, wherein each of said at least first and second data queues are operable to receive 32-bit data.

17. The apparatus of claim 14, wherein each of said at least first and second data queues are operable to output 64-bit data.

18. The apparatus of claim 14, wherein said reading logic outputs 64-bit data to said output queue.

19. The apparatus of claim 14, wherein said reading logic outputs 64-bit data to said output queue at a rate which approximates twice the speed at which said data is input into each of said at least first and second data queues.

20. The apparatus of claim 14, wherein said predetermined criteria is when said data enqueued in said second data queue reaches approximately 25% of the capacity of said second data queue.

21. The apparatus of claim 14, wherein when reading logic begins to read a fragment of said data, said reading logic continues to read said fragment until an end of said fragment is detected.

22. The apparatus of claim 14, wherein the size of either of said at least first and second data queues is approximately twice the size of a largest data fragment which can be input to either of said at least first and second data queues.

23. The apparatus of claim 14, wherein said at least first data queue is operable to enqueue said data which is fragmented, said fragmented data ranging from a minimum size to approximately sixteen times said minimum size.

24. The apparatus of claim 14, wherein said at least first data queue is operable to enqueue said data which is randomly fragmented, said randomly fragmented data ranging from a minimum size to approximately sixteen times said minimum size.

25. The apparatus of claim 14, wherein said reading logic reads a data fragment from said at least first data queue only when a complete said data fragment is enqueued therein.

26. The apparatus of claim 14, wherein said first data queue is selected for reading enqueued data therefrom only after said reading logic has completed reading said data of said second data queue.

* * * * *